(12) United States Patent
Luczak et al.

(10) Patent No.: US 7,322,795 B2
(45) Date of Patent: Jan. 29, 2008

(54) FIRM COOLING METHOD AND HOLE MANUFACTURE

(75) Inventors: Blake J. Luczak, Manchester, CT (US); Eric L. Couch, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 188 days.

(21) Appl. No.: 11/340,911

(22) Filed: Jan. 27, 2006

(65) Prior Publication Data
US 2007/0177975 A1 Aug. 2, 2007

(51) Int. Cl.
*F01D 5/18* (2006.01)

(52) U.S. Cl. ..................... 416/96 A; 416/91; 416/97 R (58) Field of Classification Search .............. 415/115, 415/191, 200, 208.1, 915; 416/91, 97 R, 416/96 A, 223 A; 29/888.024, 888.025
See application file for complete search history.

(56) References Cited

U.S. PATENT DOCUMENTS

| | | | | |
|---|---|---|---|---|
| 3,628,880 A | * | 12/1971 | Smuland et al. | 415/175 |
| 5,290,143 A | * | 3/1994 | Kington et al. | 415/191 |
| 5,405,242 A | * | 4/1995 | Auxier et al. | 415/115 |

* cited by examiner

*Primary Examiner*—Igor Kershteyn
(74) *Attorney, Agent, or Firm*—Bachman & LaPointe, P.C.

(57) ABSTRACT

A cooled cast part has an exterior surface. A cooling passageway system extends from at least one inlet port to a plurality of outlet ports. The passageway system includes a first passageway to at least a first of the outlets and surrounding at least one post. The system includes a second passageway to at least a second of the outlets passing through the at least one post.

20 Claims, 6 Drawing Sheets

FIRM COOLING METHOD AND HOLE MANUFACTURE

BACKGROUND OF THE INVENTION

The invention relates to cooling of high temperature components. More particularly, the invention relates to film cooling of gas turbine engine components.

In the aerospace industry, a well-developed art exists regarding the cooling of components such as gas turbine engine components. Exemplary components are gas turbine engine blades and vanes. Exemplary blades and vanes are cooled by airflow directed through the blade or vane airfoil to be discharged from cooling holes in the airfoil surface. The cooling mechanisms may include both direct cooling as the airflow passes through the airfoil and film cooling after the airflow has been discharged from the airfoil but passes downstream close to the airfoil surface.

SUMMARY OF THE INVENTION

To provide effective film cooling, it is desirable to minimize the pre-discharged heating of the film cooling air. This may involve using a first airflow to cool a passageway passing a second airflow so that the second airflow exits at a lower temperature than it would in the absence of the first airflow.

Accordingly, one aspect of the invention involves a cooled cast part having an exterior surface. A cooling passageway system extends from at least one inlet port to a plurality of outlet ports. The passageway system includes a first passageway to at least a first of the outlets and surrounding at least one post. The system includes a second passageway to at least a second of the outlets passing through the at least one post.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
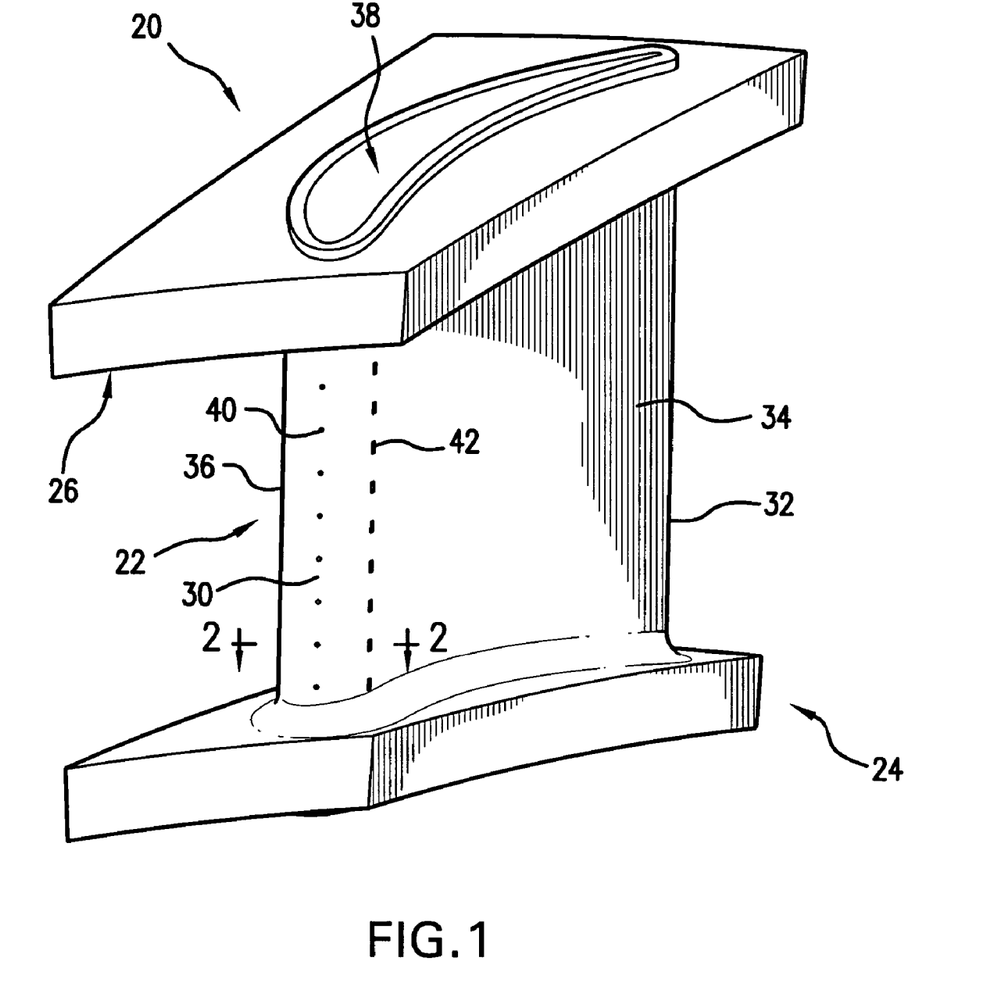
FIG. 1 is a view of a gas turbine engine vane.

FIG. 1 shows a simplified gas turbine engine vane 20. The exemplary vane is formed from a single casting and includes an airfoil 22 extending spanwise between an inboard platform 24 and an outboard shroud 26. The exemplary platform and shroud are annular segments such that a circumferential array of the vanes may be formed with the respective platforms and shrouds mounted/sealed edge-to-edge. The airfoil 22 has a leading edge 30 and a trailing edge 32. A pressure side 34 and suction side 36 extend streamwise between the leading and trailing edges.

The exemplary airfoil is cooled by air flowing in through one or more ports 38 in one or both of the platform and shroud and exiting an array of holes along the airfoil. The exemplary airfoil of FIG. 1 includes a spanwise series of first holes/outlets 40 along or near the leading edge 30 and second holes/outlets 42 along the pressure side 34 just downstream of the leading edge 30. The airfoil may have other holes such as additional film cooling holes (not shown) along the pressure and suction sides and trailing edge outlets (not shown).

Figure 2:
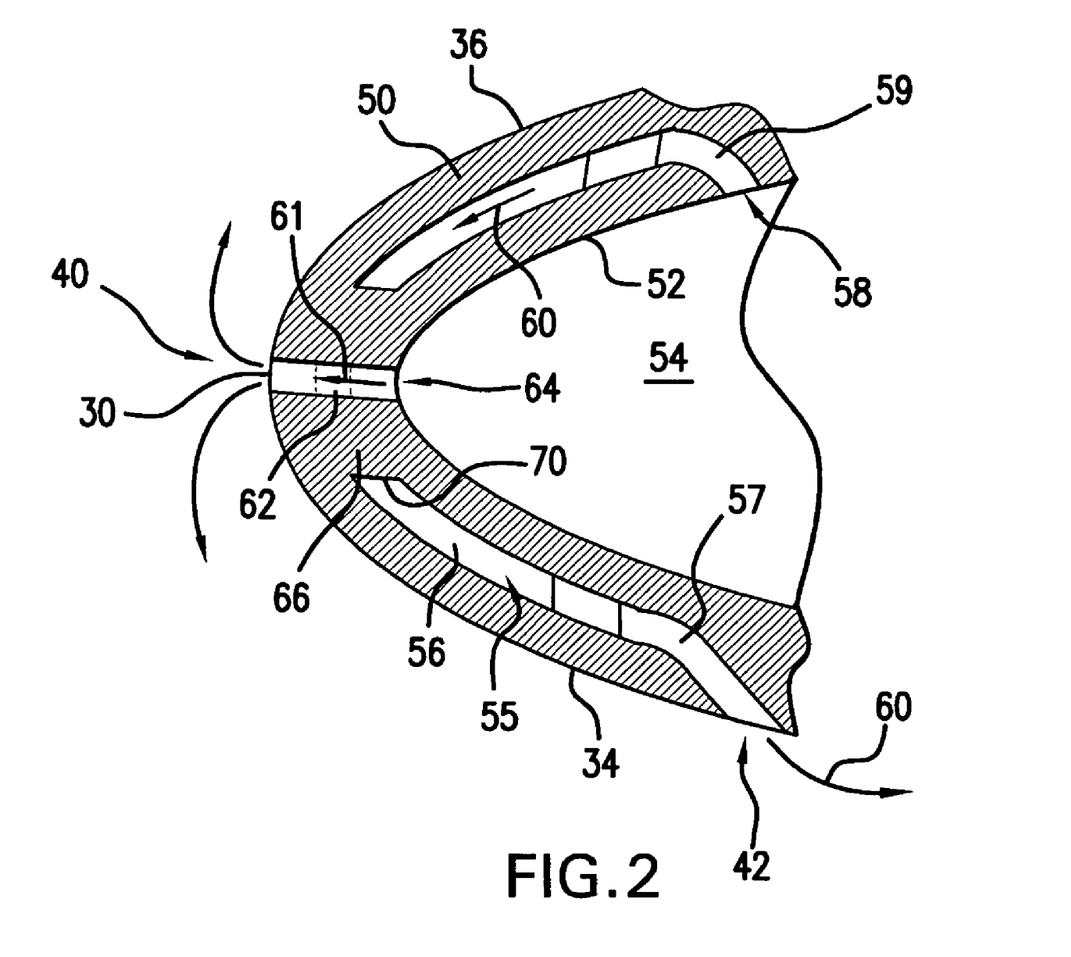
FIG. 2 is a sectional view of the vane of FIG. 1, taken along line 2-2.

FIG. 2 shows a region of the airfoil near the leading edge 30. The airfoil is shown having a wall 50 locally having an interior surface 52 bounding a spanwise leading edge feed passageway 54. A cooling plenum 55 is positioned within the wall, spanning the leading edge and having a main portion 56. The outlets 42 are the outlets of the plenum 55 at ends of associated pressure outlet passageways 57. A corresponding spanwise series of inlets 58 feed the plenum through corresponding inlet passageways 59. Accordingly, a first airflow 60 passes through the plenum 55 from the inlets 58 and is discharged from the outlets 42 to flow downstream along the pressure side 34. The flow 60 thus provides direct cooling of the wall 50 adjacent the plenum and may also provide film cooling of the wall 50 along the pressure side 34 downstream of the outlets 42.

Cooling near the leading edge 30 may be particularly important. To provide additional cooling, a series of outlet passageways 62 extend directly to the outlets 40 from associated inlets 64 along the feed passageway 54. The passageways 62 pass an airflow 61 which exits the outlets 40. The passageways 62 pass through posts 66 within the plenum main portion 56. The posts 66 span between inboard and outboard portions of the wall 50. The perimeter surface 70 of each post is cooled by the airflow 60. This cooling limits the heating of the second airflow 61 as the second airflow passes between the inlets 64 and outlets 40. Accordingly, the airflow 61 may be relatively cool upon discharge from the outlets 40 and thus provides a particularly enhanced film cooling effect.

Figure 3:
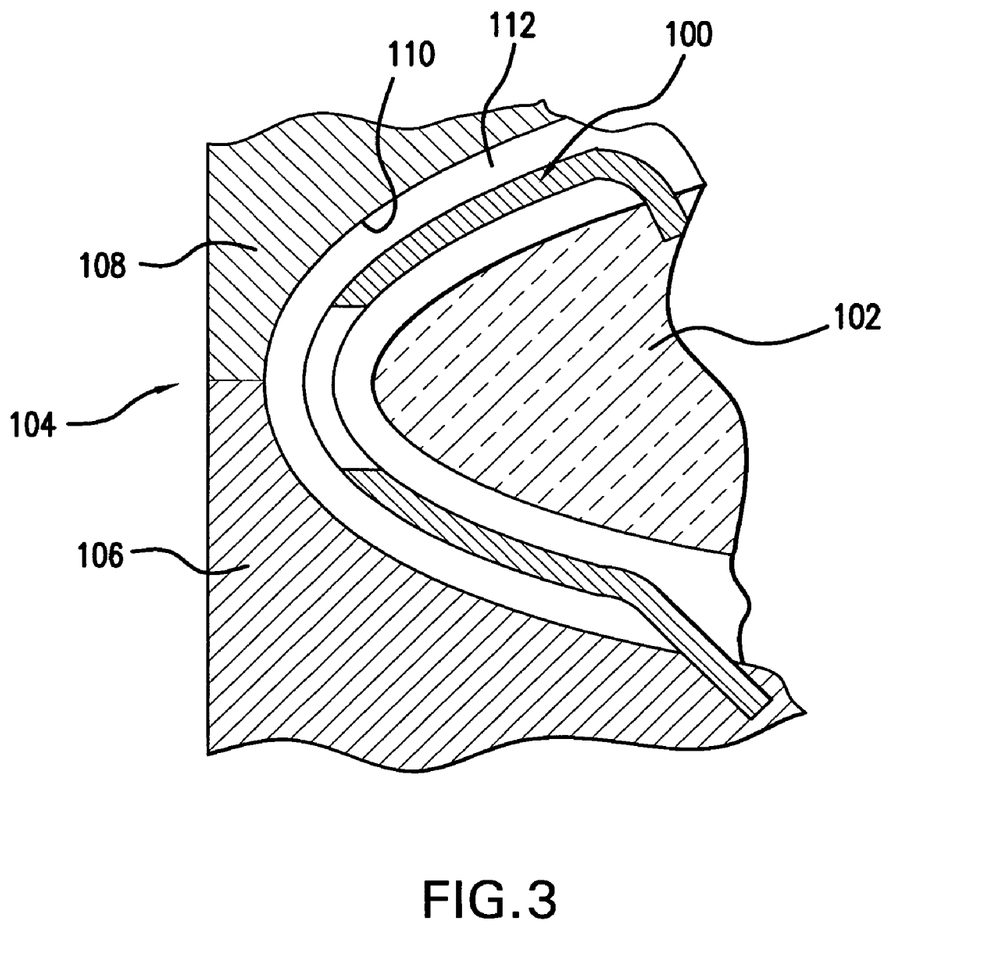
FIG. 3 is a sectional view of a core assembly and pattern-forming die for forming a pattern for casting the vane of FIG. 1.
Figure 4:
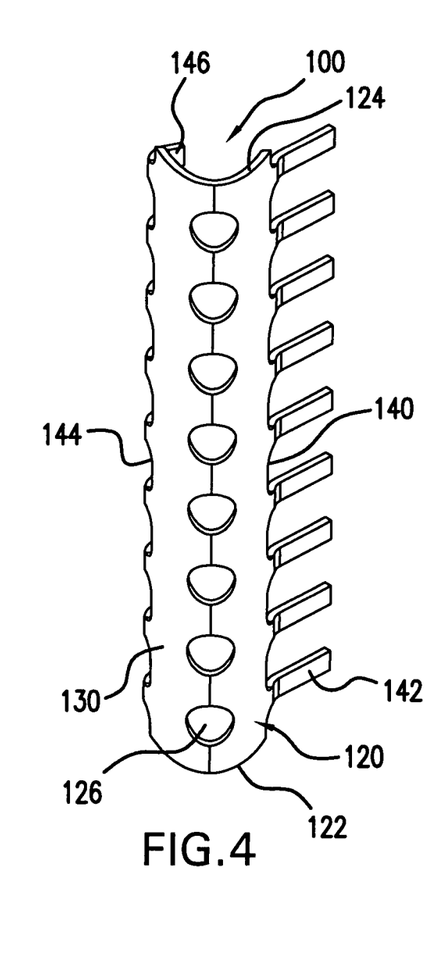
FIG. 4 is a leading view of a refractory metal core (RMC) of the core assembly of FIG. 3.
Figures 5, 6:
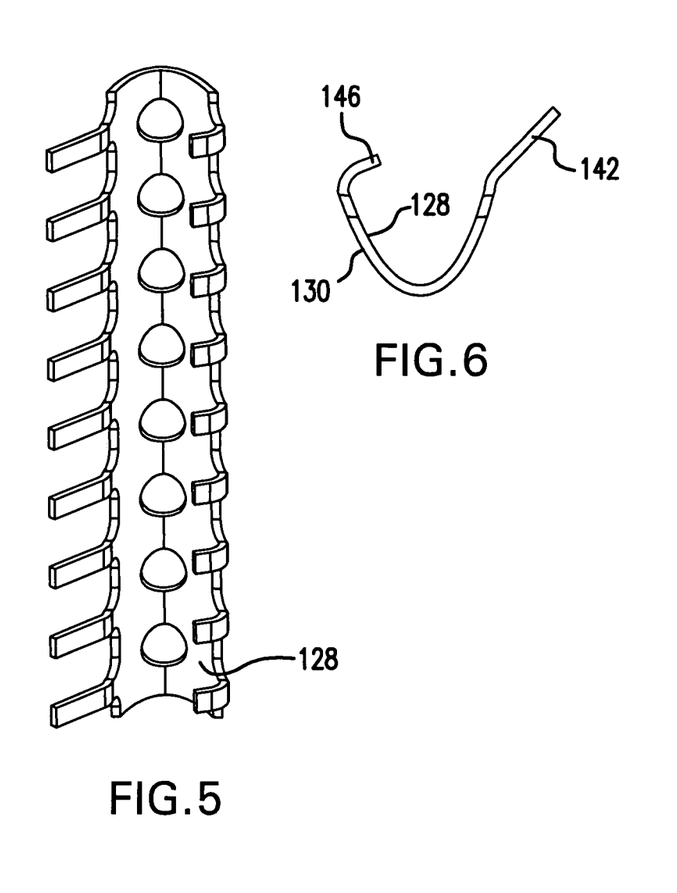
FIG. 5 is a trailing view of the RMC of FIG. 4.
FIG. 6 is a spanwise end view of the RMC of FIG. 4.
Figure 7:
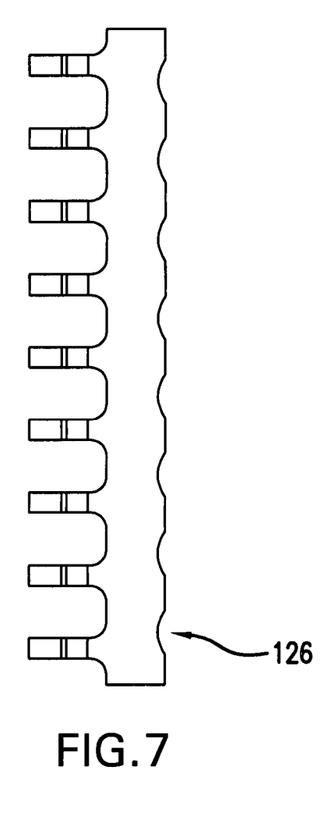
FIG. 7 is a plan view of the RMC of FIG. 4.

The vane 20 or other cooled component may be formed by an investment casting process. An exemplary process uses a refractory metal core (RMC) 100 (FIG. 3) to cast the plenum 55 and a ceramic feedcore 102 to cast the feed passageway 54. FIG. 3 shows the RMC 100 assembled to the feedcore 102 within a pattern die 104. The exemplary die 104 has a pair of die halves or pulls 106 and 108 having interior surfaces 110 positioned to define a cavity 112 for molding sacrificial pattern material (e.g., natural or synthetic wax) over the core assembly. After molding, the pattern may be removed from the die and shelled (e.g., in a multi-stage stuccoing process). The shell may be dewaxed and fired to form a mold in which molten metal is cast. After casting, the shell and core assembly may be removed (e.g., by mechanical breaking of the shell and chemical removal of the core assembly). The casting may be subject to machining and additional treatment including the application of a protective coating.

FIGS. 4-7 show further details of the exemplary RMC 100. The RMC 100 has a main body 120 extending from a first spanwise end 122 to a second spanwise end 124. The body 120 is shaped to cast the plenum main portion 56. Accordingly, the body 120 has a spanwise array of apertures 126 positioned and shaped to cast the posts 66. The posts 126 extend between an inner core surface 128 and an outer core surface 130. The body 120 has a first edge 140 from which a spanwise array of tabs 142 extend. The body has a second edge 144 from which a spanwise array of tabs 146 extend. Proximal portions of the tabs 142 are positioned and configured to cast the plenum outlet passageways 57. Distal portions of the tabs 142 may be received in corresponding compartments in the die to register the RMC relative to the die. The distal portions of the tabs 142 may, subsequently, become embedded in the shell to retain/position the RMC during casting. Proximal portions of the tabs 146 are positioned and configured to cast the inlet passageways 59. Distal portions of the tabs 146 are configured to be received in one or more corresponding compartments in the feed core 102 to secure and register the RMC relative to the feed core.

Figure 8:
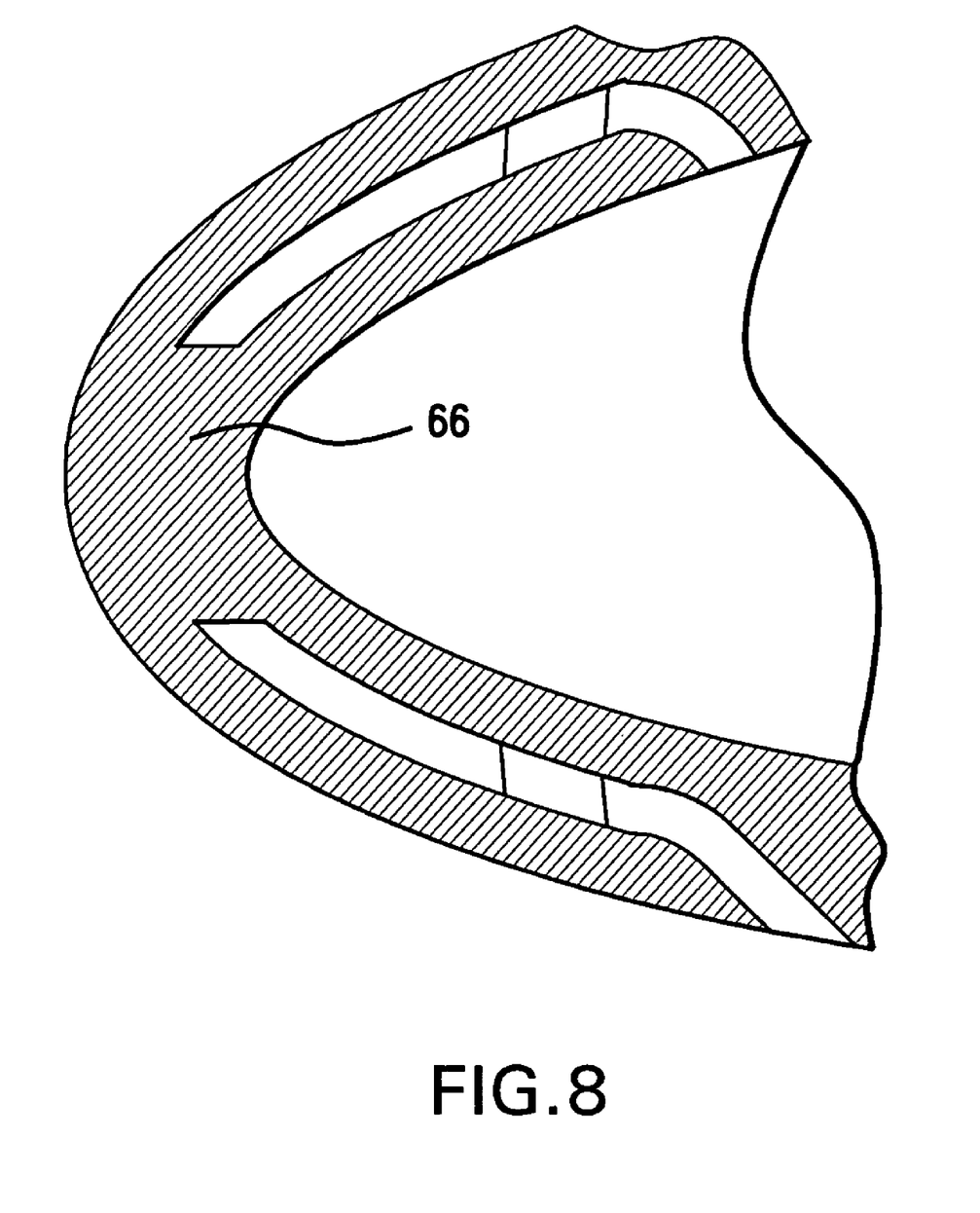
FIG. 8 is a sectional view of an intermediate casting of the vane of FIG. 1.
Figure 9:
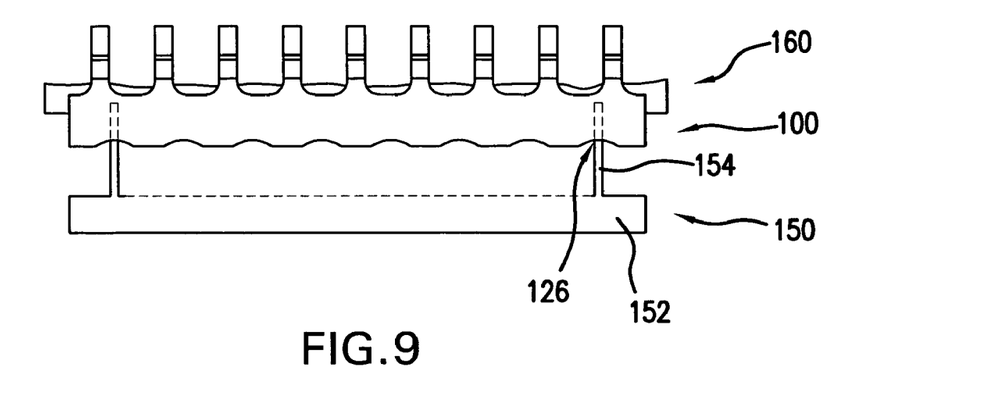
FIG. 9 is a plan view of an alternate core assembly.
Figure 10:
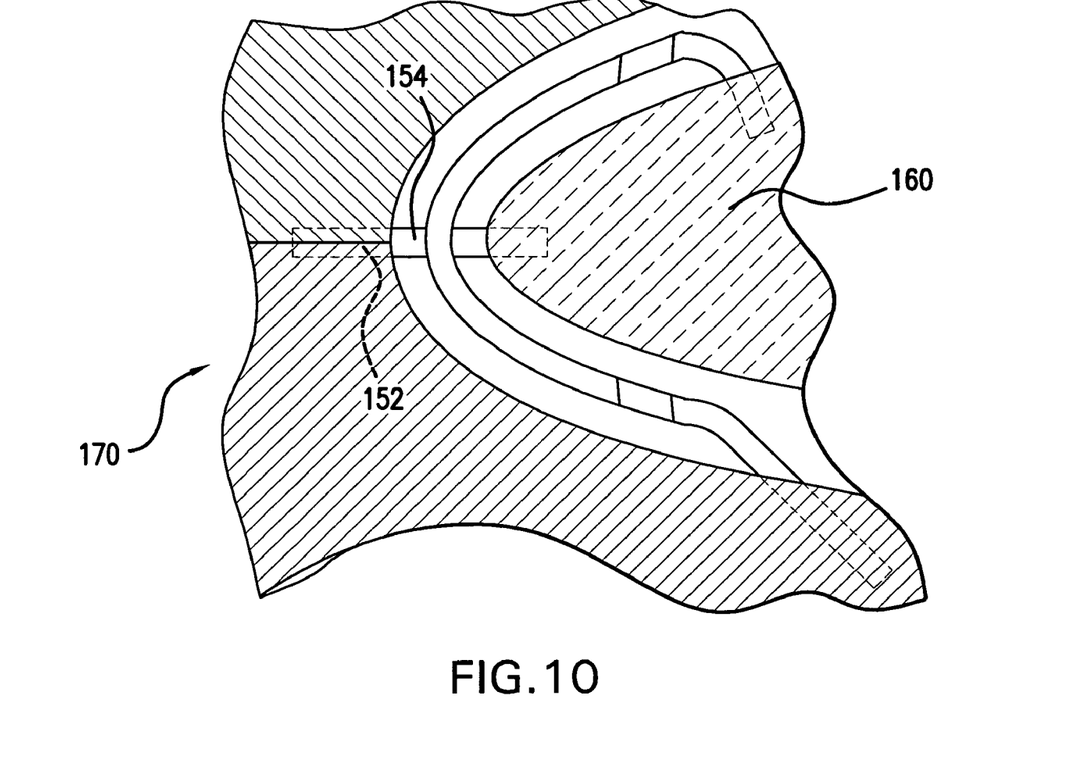
FIG. 10 is a sectional view of the core assembly of FIG. 9 in a pattern-forming die.

FIG. 8 shows the as-cast part prior to drilling the passageways 62 and their outlet holes 40. Exemplary drilling may be by mechanical drilling, laser drilling, or electro-discharge machining (EDM). Alternatively, the passageways 62 could be cast. In one example, FIGS. 9 and 10 show a second RMC 150 for forming the passageways 62 and outlets 40. The exemplary RMC 150 is comb-like, having a spine 152 and a spanwise array of tines 154 extending from the spine. Proximal portions of the tines 154 are configured and positioned to pass through the apertures 126 in the first RMC 100. Distal portions are positioned and configured to be received by a ceramic feedcore 160 (FIG. 10) which may be otherwise similar to the feedcore 102. In an exemplary core assembly sequence, the first RMC 100 is assembled to the feedcore 160. Then, the second RMC 150 is assembled to the feedcore by inserting its tines 154 through the apertures 126 and into one or more slots or other blind compartments in the feedcore 160. The core assembly may then be placed in a pattern-forming die 170.

One or more embodiments of the present invention have been described. Nevertheless, it will be understood that various modifications may be made without departing from the spirit and scope of the invention. For example, when implemented in the reengineering of a baseline component, details of the baseline component may influence details of any particular implementation. Although the exemplary posts are of circular cross-section and spaced apart from the adjacent plenum wall around entireties of their peripheries, other configurations are possible. Similarly, various shapes and distributions of the holes through the posts are possible. Accordingly, other embodiments are within the scope of the following claims.

What is claimed is:

1. A cooled cast turbine engine airfoil element comprising:
   an exterior surface; and
   a cooling passageway system extending from at least one inlet port to a plurality of outlet ports,
   wherein the passageway system comprises:
   a first passageway, being a leading edge cooling plenum, to at least a first of the outlets and surrounding at least one post, there being a spanwise array of at least five said posts; and
   a second passageway to at least a second of the outlets and passing through the at least one post.

2. The turbine engine airfoil element of claim 1 consisting essentially of a coated casting.

3. The turbine engine airfoil element of claim 1 being one of:
   a gas turbine engine vane;
   a gas turbine engine blade; and
   a gas turbine engine combustor component.

4. The turbine engine airfoil element of claim 1 comprising a ni-based superalloy casting.

5. A method for manufacturing a cooled part comprising:
   forming a plurality of feed passageways;
   forming a plenum in communication with at least one of the feed passageways and having a plurality of posts;
   forming outlet passageways through the plurality of posts and in communication with at least one said feed passageway.

6. The method of claim 5 including:
   casting over a core assembly and then destructively removing the core assembly wherein a first portion of the core assembly essentially leaves said feed passageways and second portion of the core assembly leaves at least a portion of the plenum surrounding the posts.

7. The method of claim 5 wherein:
   said forming of the outlet passageways comprises drilling through said posts.

8. The method of claim 5 wherein:
   said forming of the plenum comprises casting with a refractory metal-based core having apertures defining said posts.

9. The method of claim 8 wherein:
   said forming of the outlet passageways comprises drilling through said posts.

10. The method of claim 8 wherein:
    said forming of the outlet passageways comprises said casting with a second refractory metal core having tines extending through said apertures.

11. The method of claim 5 used to cast a turbine engine airfoil element wherein:
    the forming of the plenum positions the plenum as a leading edge plenum.

12. A gas turbine engine airfoil element comprising:
    an airfoil having:
    first and second ends;
    leading and trailing edges;
    pressure and suction sides; and
    an internal cooling passageway system including a leading edge plenum having a plurality of first outlets,
    wherein:
    at least one post extending across the leading edge plenum; and
    at least one outlet passageway extending through the at least one post to at least one second outlet, there being a plurality of said posts, each having an associated said outlet passageway.

13. The element of claim 12 being a vane wherein:
    the first and second ends are, respectively, at an inboard shroud segment and an outboard shroud segment.

14. The element of claim 12 wherein:
    there is a spanwise array of said posts.

15. A method for cooling a surface of a cast part comprising:
    passing a first cooling flow through a chamber in the cast part, the first cooling flow passing around one or more posts within the chamber and exiting one or more first outlets; and
    passing a second cooling flow through the one or more posts to exit one or more second outlets and provide film cooling along a surface of the part.

16. The method of claim 15 wherein:
the first and second cooling flows are passed from a single passageway.

17. The method of claim 15 wherein:
the first and second cooling flows are passed from a single passageway being one of an impingement passageway or feed passageway of a turbine engine blade or vane.

18. The method of claim 15 wherein:
the chamber is a plenum along a leading edge portion of an airfoil; and
there are a plurality of said posts passing said second cooling flow.

19. The method of claim 18 wherein:
the first and second cooling flows are passed from a single passageway being one of an impingement passageway or feed passageway of a turbine engine blade or vane.

20. The method of claim 18 wherein:
the first cooling flow passes around the posts from a pressure side to a suction side of an airfoil.

* * * * *

UNITED STATES PATENT AND TRADEMARK OFFICE
CERTIFICATE OF CORRECTION

| | | |
|---|---|---|
| PATENT NO. | : 7,322,795 B2 | Page 1 of 1 |
| APPLICATION NO. | : 11/340911 | |
| DATED | : January 29, 2008 | |
| INVENTOR(S) | : Blake J. Luczak et al. | |

It is certified that error appears in the above-identified patent and that said Letters Patent is hereby corrected as shown below:

On the Title Page, Item (54) and at Column 1, line 1, the title should be amended as follows: delete "FIRM" and insert --FILM--.

Signed and Sealed this

Twentieth Day of April, 2010

David J. Kappos
*Director of the United States Patent and Trademark Office*